United States Patent
Abke

(10) Patent No.: US 7,360,393 B1
(45) Date of Patent: Apr. 22, 2008

(54) METHODS AND APPARATUS FOR MEASURING IMPACT TOUGHNESS OF A TIE ROD END

(75) Inventor: Timothy A. Abke, Zanesfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 35 days.

(21) Appl. No.: 11/592,626

(22) Filed: Nov. 3, 2006

(51) Int. Cl.
*G01M 7/00* (2006.01)

(52) U.S. Cl. ..................................... 73/12.14

(58) Field of Classification Search ..... 73/12.12–12.14
See application file for complete search history.

(56) References Cited

U.S. PATENT DOCUMENTS

| | | | | |
|---|---|---|---|---|
| 3,583,215 | A | * | 6/1971 | Franz ........................ 73/844 |
| 3,727,455 | A | * | 4/1973 | Boder ........................ 73/167 |
| 4,425,786 | A | * | 1/1984 | Sirkkola et al. ........... 73/12.14 |
| 4,442,697 | A | | 4/1984 | Jones et al. |
| 4,546,654 | A | | 10/1985 | Isherwood et al. |
| 4,674,366 | A | | 6/1987 | Lauer et al. |
| 5,141,542 | A | | 8/1992 | Fangeat et al. |
| 5,770,791 | A | | 6/1998 | Manahan, Sr. |
| 5,824,880 | A | | 10/1998 | Burwell et al. |
| 6,308,555 | B1 | | 10/2001 | Liem et al. |
| 6,523,391 | B1 | | 2/2003 | Knox et al. |

* cited by examiner

*Primary Examiner*—Max Noori
(74) *Attorney, Agent, or Firm*—Ulmer & Berne LLP

(57) ABSTRACT

A method is provided for measuring impact toughness of a tie rod end through use of a pendulum-type impact testing machine. The method includes attaching a first member of the tie rod end with respect to a base of the pendulum-type impact testing machine. The pendulum-type impact testing machine is operated such that the hammer impacts the second member of the tie rod end. Force arising from the impact of the hammer upon the second member of the tie rod end is measured. A support apparatus is also provided for supporting the tie rod end in a position to receive contact from the hammer of the pendulum-type impact testing machine.

23 Claims, 4 Drawing Sheets

METHODS AND APPARATUS FOR MEASURING IMPACT TOUGHNESS OF A TIE ROD END

TECHNICAL FIELD

The present invention relates to methods and apparatus for measuring the impact toughness of a tie rod end through use of a pendulum-type impact testing machine.

BACKGROUND OF THE INVENTION

Tie rod ends are often employed as components of vehicles and other equipment. In one particular application, a tie rod end is employed as part of a vehicle's suspension system to facilitate attachment of a vehicle's tie rod to a wheel spindle or king pin of the vehicle. An example of a conventional tie rod end 10 is depicted in FIG. 1 to include a first member 12 and a second member 14. The first member 12 has a threaded end 16 and an opposite end 18 disposed along a first longitudinal axis $L_1$. The opposite end 18 is shown to comprise at least a portion of a pivot ball joint 19. The second member 14 has a proximal end 20 and a distal end 22 disposed along a second longitudinal axis $L_2$. The proximal end 20 of the second member 14 interfaces the pivot ball joint 19, wherein the opposite end 18 and the proximal end 20 are pivotally attached through the pivot ball joint 19 such that the first member 12 and the second member 14 are pivotally attached together, and such that the distal end 22 of the second member 14 is pivotable between limit positions with respect to the threaded end 16 of the first member 12. A seal 15 can be provided to prevent dirt and moisture from accessing the pivot ball joint 19. Although the threaded end 16 of the first member 12 is shown to be of a type having internal threads (e.g., for receiving an externally threaded end of a tie rod), alternative conventional tie rod ends can have a first member which includes external threads (e.g., as present upon the distal end 22). Likewise, although the distal end 22 of the second member 14 is shown to have external threads (e.g., for penetrating an aperture in a wheel spindle or king pin), alternative conventional tie rod ends can have a second member which includes internal threads (e.g., as present within the threaded end 16).

In many applications, such as when used in vehicular steering systems, tie rod ends are subjected to significant impact loading. Accordingly, when selecting a tie rod end for use with a particular piece of equipment (e.g., an automobile or all terrain vehicle), it is important that a tie rod end of adequate toughness is selected. If a tie rod end of inadequate toughness is selected, the tie rod end can be prone to premature failure, thereby resulting in catastrophic failure of the associated equipment. However, conventional methods and apparatuses do not allow for adequate testing of tie rod ends to ensure their ability to exhibit a predetermined amount of impact toughness. As such, there is a need for improved methods and apparatus which can be easily and inexpensively employed to facilitate impact testing of a tie rod end.

SUMMARY OF THE INVENTION

In accordance with one embodiment of the present invention, a method is provided for measuring impact toughness of a tie rod end through use of a pendulum-type impact testing machine. The method comprises providing a tie rod end having a first member and a second member which are pivotally attached together. A pendulum-type impact testing machine having a base and a hammer is also provided. The hammer is configured for pivotable movement with respect to the base. The first member of the tie rod end is attached with respect to the base of the pendulum-type impact testing machine. The pendulum-type impact testing machine is operated such that the hammer impacts the second member of the tie rod end. Force arising from the impact of the hammer upon the second member of the tie rod end is measured.

In accordance with another embodiment of the present invention, a method is provided for measuring impact toughness of a tie rod end. The method comprises providing a pendulum-type impact testing machine having a base, a hammer, and a measurement apparatus. The hammer is configured for pivotable movement with respect to the base, about a pivot axis, and over an arc defining a first plane. The measurement apparatus is configured to measure force arising from impact of the hammer upon an object secured with respect to the base. A tie rod end is provided which has a first member and a second member. The first member comprises a threaded end and at least a portion of a pivot ball joint opposite the threaded end. A proximal end of the second member interfaces said pivot ball joint such that a distal end of the second member is pivotable between limit positions with respect to the threaded end of the first member. A support apparatus is attached to the base of the pendulum-type impact testing machine. The threaded end of the tie rod end is attached to the support apparatus such that the distal end reaches one of the limit positions in which a longitudinal axis of the second member lies within a second plane perpendicular with the first plane and parallel with or including the pivot axis of the hammer. The pendulum-type impact testing machine is operated such that the hammer impacts the second member substantially perpendicularly to the longitudinal axis of the second member. Force arising from the impact is measured through use of the measurement apparatus.

In accordance with yet another embodiment of the present invention, a support apparatus is configured for supporting a tie rod end in a position to receive contact from a hammer of a pendulum-type impact testing machine. The support apparatus comprises a mounting structure and a support structure. The mounting structure has a bottom surface and at least one mounting provision. The mounting provision is configured to facilitate securement of the mounting structure such that the bottom surface contacts a base of a pendulum-type impact testing machine. The bottom surface lies substantially within a first plane. The support structure is attached to the mounting structure and is inclined with respect to the first plane. The support structure is configured to receive attachment of a first member of a tie rod end such that a second member of the tie rod end is movable into a limit position in which a longitudinal axis of the second member is perpendicular with the first plane.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EMBODIMENTS

Figure 3:
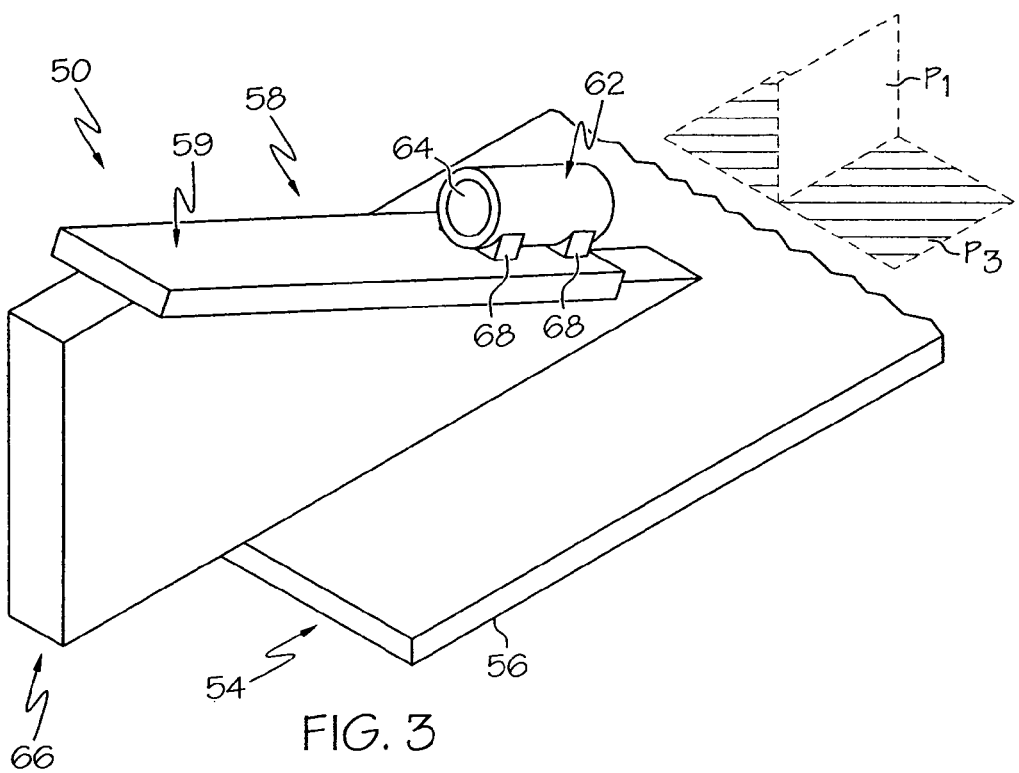
FIG. 3 is a perspective view depicting the support apparatus of FIG. 2.
Figure 4:
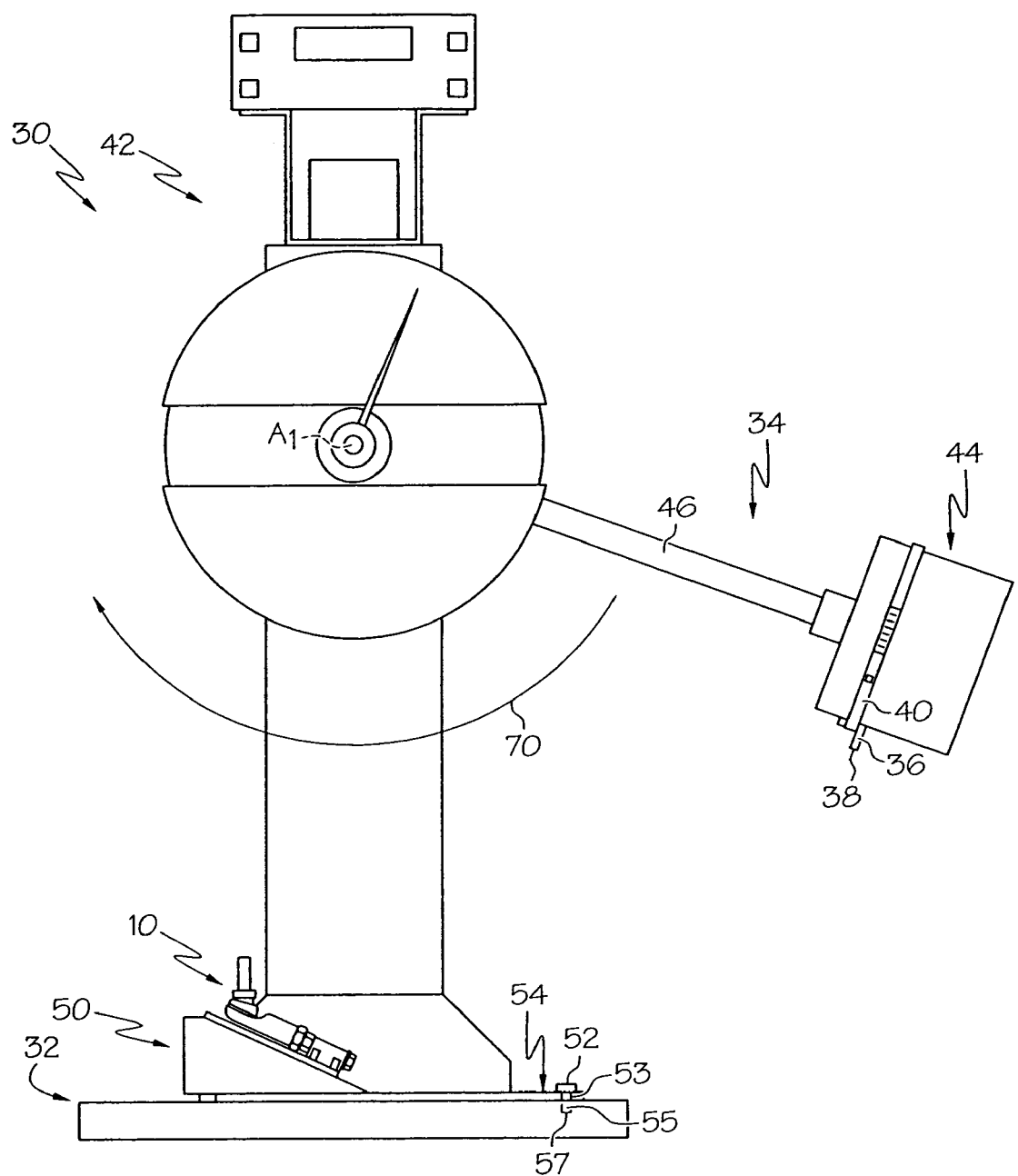
FIG. 4 is an elevational view depicting the tie rod end of FIG. 1 attached to the support apparatus of FIG. 2 which is attached to a base of a pendulum-type impact testing machine in accordance with one embodiment of the present invention, wherein the second member of the tie rod end is pivoted into a limit position with respect to the first member of the tie rod end.

Embodiments of the present invention and its operation are hereinafter described in detail in connection with the views and examples of FIGS. 1-7, wherein like numbers indicate the same or corresponding elements throughout the views. A pendulum-type impact testing machine 30 is shown in FIG. 4 to include a base 32, a hammer 34, and a measurement apparatus 42. The hammer 34 comprises an arm 46 and a head 44. In use, an object for testing is secured with respect to the base 32, and the hammer 34 is then pivoted about a pivot axis $A_1$ with respect to the base 32, over an arc 70, and until the head 44 impacts the object. The arc 70 traveled by the hammer 34 defines a first plane $P_1$. The pendulum-type impact testing machine 30 can be configured such that the rotational speed and/or force of the hammer 34 along arc 70 can be adjusted as desired for testing of a particular object. The measurement apparatus 42 is configured to measure force arising from impact of the hammer 34 upon the object secured with respect to the base 32. The toughness of the object can accordingly be determined. It will be appreciated that the pendulum-type impact testing machine depicted in FIG. 4 represents just one of the many types of such machines presently available in the marketplace, and such as may be purchased from SATEC, Inc. of Union, N.J., USA, and that apparatus and methods in accordance with embodiments of the present invention are suitable for use with any of a variety of such pendulum-type impact testing machines, and therefore are not limited for use with the particular pendulum-type impact testing machine depicted in FIG. 4.

In accordance with one embodiment of the present invention, a support apparatus and method are provided and configured for supporting a tie rod end in a position to receive contact from a hammer of a pendulum-type impact testing machine. The support apparatus can be formed or constructed in any of a variety of specific configurations provided that, however, the support apparatus is configured for supporting a tie rod end in a position to receive contact from a hammer of a pendulum-type impact testing machine.

By way of example, a support apparatus 50 in accordance with one particular embodiment of the present invention is hereafter described in connection with FIGS. 2-4 and 6.

The support apparatus 50 includes a mounting structure 54 and a support structure 58. The mounting structure 54 is configured for attachment to a base (e.g., 32 in FIGS. 4 and 6) of a pendulum-type impact testing machine (e.g., 30 in FIG. 4) and includes a bottom surface 56 which is configured for contacting the base. The mounting structure 54 also includes at least one mounting provision which is/are configured to facilitate attachment of the mounting structure 54 to the base of the pendulum-type impact testing machine to prevent the support apparatus 50 from moving when a tie rod end attached to the support apparatus 50 is impacted by a hammer (e.g., 34 in FIGS. 4 and 6) of the pendulum-type impact testing machine.

In one particular embodiment, as shown generally in FIG. 4, the mounting provision comprises an aperture 53 in the mounting structure 54 which is configured for receiving a threaded end 55 of a bolt 52 for subsequent insertion into a threaded aperture 57 in the base 32 of the pendulum-type impact testing machine 30. The mounting structure 54 can include any number of such apertures in order that multiple fasteners (e.g., bolt 52) may be employed for attaching the support apparatus 50 to the base 32 of the pendulum-type impact testing machine 30. A mounting structure in accordance with the present invention can alternatively or additionally include any of a variety of other mounting provisions such as may involve other features which mechanically interface the base of a pendulum-type impact testing machine. Such features can, for example, include spikes which project from the bottom surface of the mounting structure and into apertures in the base of a pendulum-type impact testing machine. Alternatively, the features can involve ridges, walls, or ledges on the mounting structure which contact and cooperate with corresponding structures on the base of a pendulum-type impact testing machine. In certain embodiments, the mounting provisions might be configured to facilitate rapid attachment and detachment of the support apparatus 50 to/from a base of a pendulum-type impact testing machine (e.g., so as to facilitate minimal downtime between testing of different tie rod ends or other objects by a particular pendulum-type impact testing machine).

The support apparatus 50 is also shown to include a wedge-shaped intermediate member 66 for use in attaching the mounting structure 54 to the support structure 58. While the intermediate member 66 is shown to be formed from solid plate material, it will be appreciated that an intermediate member can be formed in any of a variety of alternative configurations, and/or that a support apparatus can be formed without an intermediate member. The support apparatus 50 can be formed from any of a variety of suitable materials such as metal, plastic, fiberglass, composites, or some other material or combination thereof which has sufficient strength to secure a tie rod end with respect to a base of a pendulum-type impact testing machine as described herein.

Referring again to FIG. 3, the support structure 58 is shown to include a plate 59 and a sleeve 62. In one embodiment, as shown in FIG. 3, the sleeve 62 can be attached to the plate 59 and/or to another portion of the support apparatus 50 such as with adhesives, welds (e.g., 68), fasteners, and/or through use of any of a variety of other suitable arrangements. In another embodiment, the sleeve 62 may be integrally formed with one or more other components of a support apparatus. In one embodiment, all of the components of a support apparatus can be integrally provided, such as through a common casting process. While the sleeve 62 is shown in FIG. 3 to have a cylindrical exterior configuration, an alternative sleeve can have any of a variety of alternative exterior configurations. The sleeve 62 is also shown to comprise a bore 64 which extends centrally and longitudinally through the sleeve 62. Although the bore 64 is shown to have a circular cross-sectional configuration, it could alternatively be provided to have a different cross-sectional configuration (e.g., ovular or rectangular).

The bore 64 can be configured to interface a first member of a tie rod end. In one particular embodiment, to facilitate attachment of a first member of a tie rod end to a support apparatus, at least one bolt can be inserted through a bore in the support apparatus and can then be threaded into a threaded end of the first member of the tie rod end. For example, as shown generally in FIG. 4, and referring also to FIG. 1, a threaded shaft 26 of a bolt 24 can be inserted through the bore 64, through a washer 27, through a nut 28, and then into a threaded receptacle provided in the threaded end 16 of the first member 12 of the tie rod end 10. To secure the first member 12 with respect to the support apparatus 50, the bolt head 25 can be tightened (e.g., by gripping the bolt head 25 with a wrench) while preventing rotational movement of the nut 28 and/or the first member 12 (e.g., by gripping a grip portion 17 of the first member 12 with another wrench). In an alternative embodiment, a tie rod end may be provided with an externally threaded shaft, in which circumstance the shaft can be inserted through the bore 64 of the sleeve 62 and then ultimately into a threaded securement member such as a nut. It will therefore be appreciated that a first member of a tie rod end can be attached to a support apparatus, and thus with respect to a base of a pendulum-type impact testing machine, in any of a variety of alternative configurations or arrangements in accordance with the teachings of the present invention.

Figure 5:
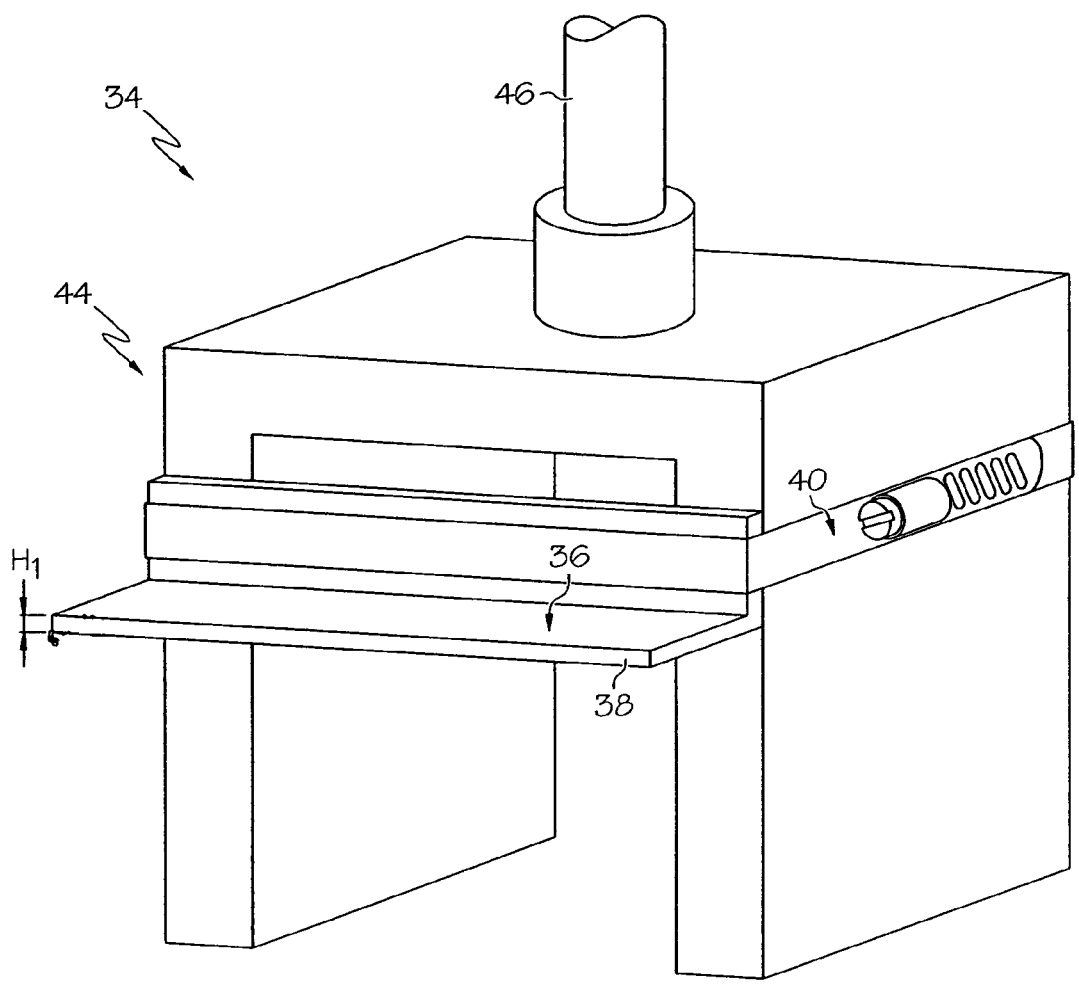
FIG. 5 is a perspective view depicting a portion of the hammer of the pendulum-type impact testing machine of FIG. 4.
Figure 7:
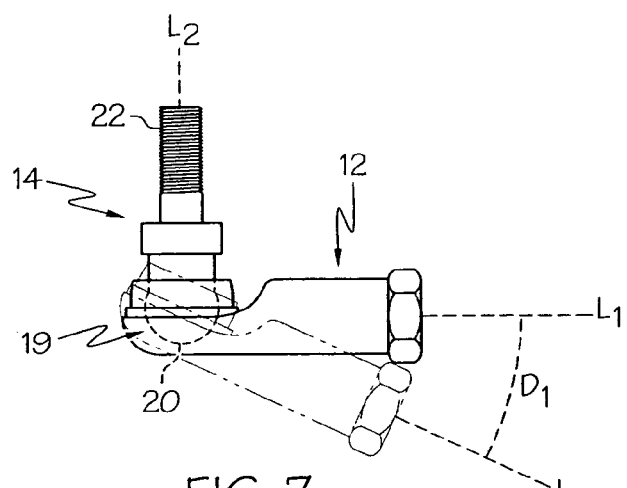
FIG. 7 is a side elevational view depicting the tie rod end of FIG. 1 wherein the second member of the tie rod end is shown as being pivoted with respect to the first member of the tie rod end in both the centered position of FIG. 1 (shown in solid lines) and the limit position of FIG. 6 (shown in dashed lines).

In accordance with certain embodiments of the present invention, the head 44 of the hammer 34 of the pendulum-type impact testing machine 30 can be provided with an impact tip which is configured to focus the energy of the hammer 34 for selective impact upon a predetermined area of the second member 14 of the tie rod end 10. In one embodiment of the present invention, the impact tip can be attached to the hammer 34 of the pendulum-type impact testing machine 30. For example, an angled member 36 can be attached to the head 44 of the hammer 34, as shown in FIGS. 4-5, to provide an impact tip 38 for the hammer 34. The angled member 36 can be formed from metal or any of a variety of other materials, and can be attached to the head 44 of the hammer 34 in any of a variety of configurations or arrangements. In one particular embodiment, as shown in FIGS. 4-5, a screw-type adjustable hose clamp 40 can be employed for securement of the angled member 36 to the head 44. The impact tip 38 is shown in FIG. 5 to have a height $H_1$ of about ten millimeters, although it can alternatively have any of a variety of different heights in accordance with alternative embodiments of the present invention. In other embodiments of the present invention, an impact tip can be provided by a different structure attached to the hammer 34, or can alternatively be provided by an integral portion of the hammer.

Figure 6:
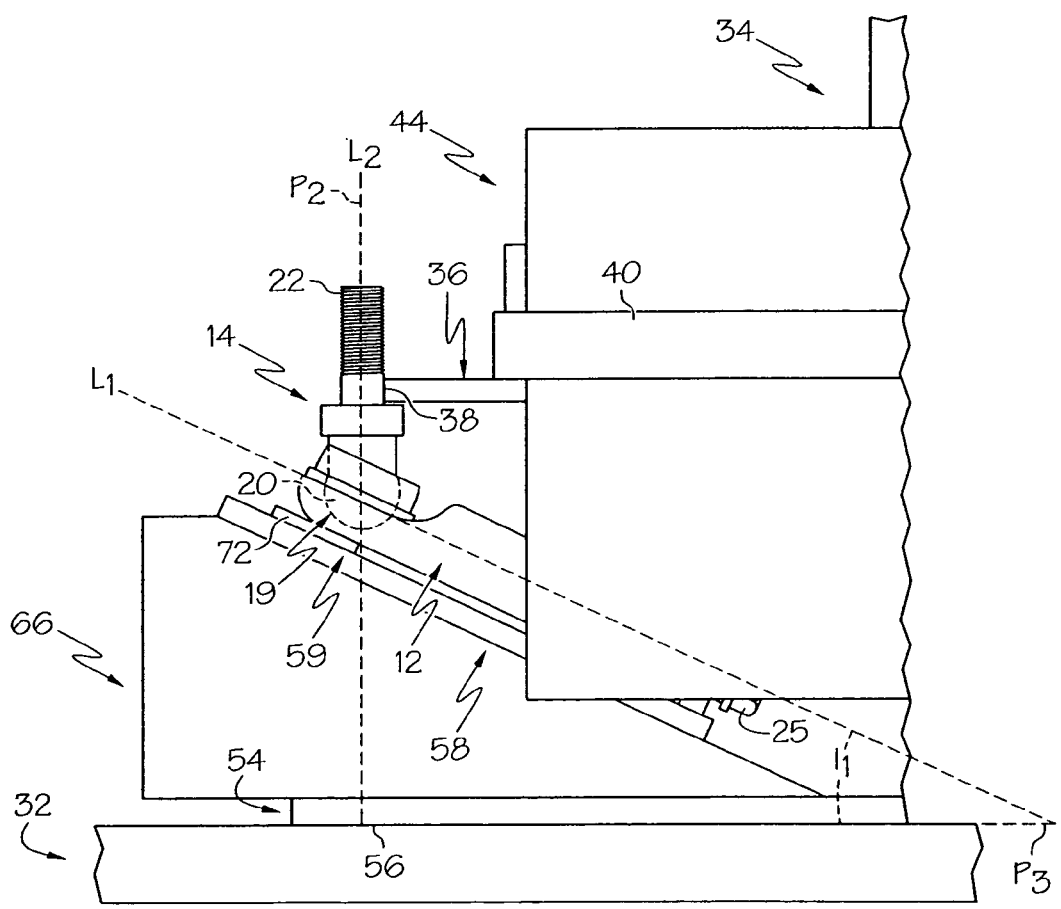
FIG. 6 is a side view depicting impact of the hammer with the tie rod end of FIG. 4.

Once the support apparatus 50 is attached to the base 32 of the pendulum-type impact testing machine 30, and the first member 12 of the tie rod end 10 is attached to the support apparatus 50, it will be appreciated that the support apparatus 50 can rigidly and immovably support the first member 12 of the tie rod end 10 with respect to the base 32 of the pendulum-type impact testing machine 30. To prepare for impact from the hammer 34, the second member 14 can be moved such that it reaches the limit position in which the longitudinal axis $L_2$ of the second member 14 (1) lies within a second plane $P_2$ which is both perpendicular with the first plane $P_1$ and is parallel with the pivot axis $A_1$ of the hammer 34 (as shown in the embodiment of FIGS. 3 and 6) or includes the pivot axis $A_1$ of the hammer. Once moved into this position, clay, tape, adhesive, or some other compound or material might be applied to the tie rod end 10 to maintain the relative position of the second member 14 with respect to the first member 12. One or more shims (e.g., 72 in FIG. 6) may also be provided (e.g., between the first member 12 and the plate 59) to prevent unwanted deflections or other movement of the tie rod end 10 during impact of the second member 14 by the hammer 34 of the pendulum-type impact testing machine 30. Accordingly, the support structure 50 can be configured to support the first member 12 of the tie rod end 10 such that the hammer 34 of the pendulum-type impact testing machine 30 impacts the second member 14 of the tie rod end 10 substantially perpendicularly to the longitudinal axis $L_2$ (shown in FIG. 1) of the second member 14 of the tie rod end 10.

Figure 1:
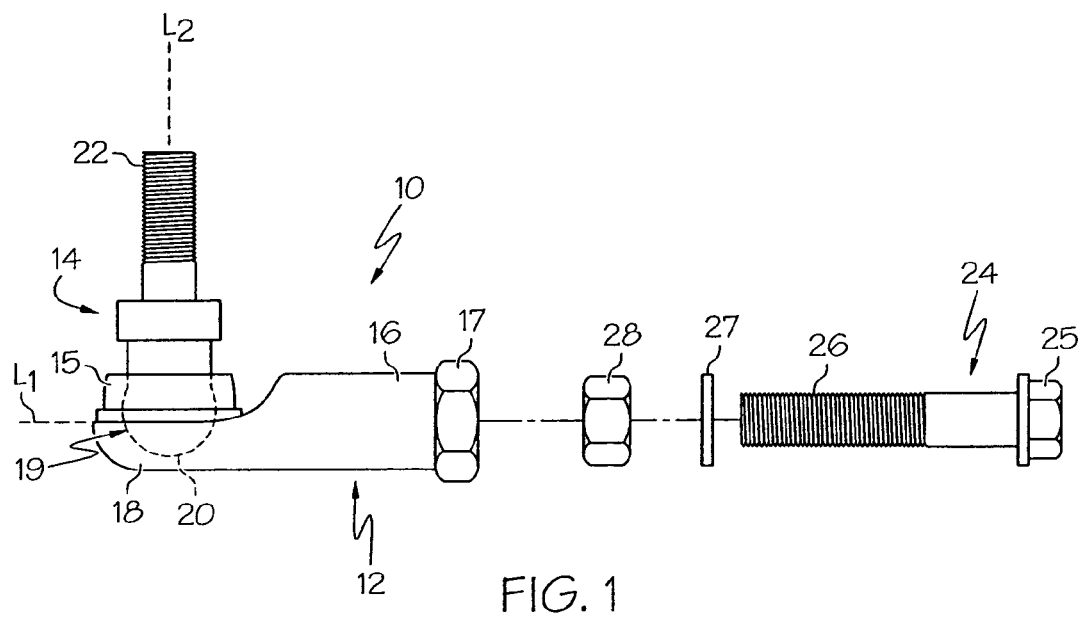
FIG. 1 is a side elevational view depicting a tie rod end in association with a bolt, a nut, and a washer in accordance with one embodiment of the present invention, wherein the second member of the tie rod end is pivoted with respect to the first member of the tie rod end in a centered position such that their respective longitudinal axes intersect substantially perpendicularly.
Figure 2:
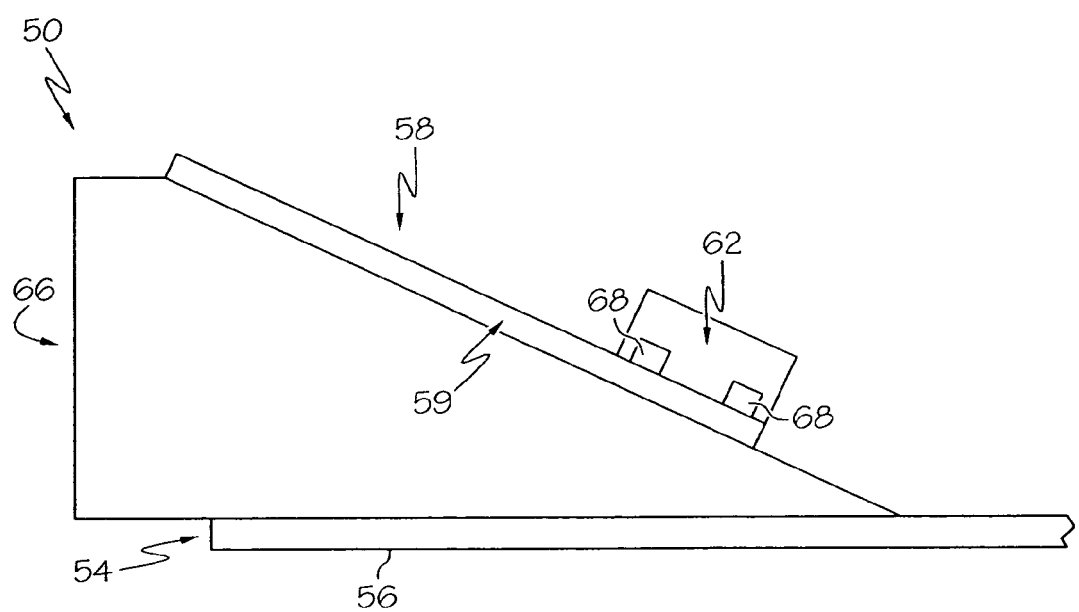
FIG. 2 is an elevational view depicting a support apparatus in accordance with one embodiment of the present invention.

For clarification, the distal end 22 of the second member 14 of the tie rod end 10 is movable into multiple limit positions. A limit position, as used herein, refers to an end-of-travel position in which further pivoting of the second member 14 with respect to the first member 12 in a particular direction is impeded by the inherent construction of the tie rod end 10. An angle of tie rod end deflection ($D_1$ shown in FIG. 7) is the angle which a second member 14 of a tie rod end 10 can travel with respect to a first member 12 of a tie rod end 10 when moving from a centered position to a limit position. The centered position of a tie rod end 10 involves the longitudinal axes $L_1$ and $L_2$ of the first and second members 12, 14 of the tie rod end intersecting substantially perpendicularly, as shown in FIG. 1 and in solid lines in FIG. 7.

As shown in the embodiment of FIG. 6, it will be appreciated that a support apparatus 50 in accordance with one embodiment of the present invention can be manufactured to have an angle of inclination ($I_1$ shown in FIG. 6) which closely corresponds with the angle of tie rod end deflection ($D_1$ shown in FIG. 7) for the tie rod end 10 to be tested. In one particular embodiment of the present invention, the angle of inclination $I_1$ and the angle of tie rod end deflection $D_1$ are both about 26.3°. However, these angles can vary in accordance with alternative embodiments of the present invention. As such, it will be appreciated that different support apparatuses might be provided for testing different types of tie rod ends through use of one or more pendulum-type impact testing machines.

As shown in FIGS. 4 and 6, the first member 12 of the tie rod end 10 can be attached to the support structure 58 such that the second member 14 of the tie rod end 10 is movable into the limit position in which the longitudinal axis $L_2$ of the second member 14 is perpendicular with a third plane $P_3$, wherein the bottom surface 56 of the mounting structure 54 lies substantially within the third plane $P_3$. In this configuration, it will be appreciated that the third plane $P_3$ can be perpendicular to each of the first plane $P_1$ and the second plane $P_2$. Also, it can be seen that the longitudinal axis $L_1$ of the first member 12 can be inclined with respect to the base 32 and can lie within or parallel with the first plane $P_1$ when the threaded end 16 of the first member 12 is attached (directly or indirectly) to the support structure 58 of the support apparatus 50.

Methods and apparatus in accordance with the teachings of the present invention can be useful for measuring the performance of tie rod ends when they are exposed to varying forces. In addition, such methods and apparatus can also be used to assess the impact of environmental conditions upon a tie rod end. For example, in one particular embodiment, the temperature of a tie rod end can be adjusted (e.g., by heating or cooling) to a predetermined temperature prior to operating the pendulum-type impact testing machine. This testing can be repeated at different predetermined temperatures as desired. Other environmental characteristics might additionally or alternatively be varied prior to testing a tie rod end such as, for example, exposure of the tie rod end to chemicals (e.g., road salt), sunlight, humidity, moisture, and/or radiation, for example. In this manner, and through such testing, the performance (e.g., toughness) of a tie rod end can effectively be predicted and verified.

The foregoing description of embodiments and examples of the invention has been presented for purposes of illustration and description. It is not intended to be exhaustive or limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. It is hereby intended that the scope of the invention be defined by the claims appended hereto.

What is claimed is:

1. A method for measuring impact toughness of a tie rod end through use of a pendulum-type impact testing machine, the method comprising:
   providing a tie rod end having a first member and a second member which are pivotally attached together;
   providing a pendulum-type impact testing machine having a base and a hammer, wherein the hammer is configured for pivotable movement with respect to the base;
   attaching the first member of the tie rod end with respect to the base of the pendulum-type impact testing machine;
   operating the pendulum-type impact testing machine such that the hammer impacts the second member of the tie rod end; and
   measuring force arising from the impact of the hammer upon the second member of the tie rod end.

2. The method of claim 1 further comprising adjusting the temperature of the tie rod end to a predetermined temperature prior to operating the pendulum-type impact testing machine.

3. The method of claim 1 wherein the first member has a threaded end and an opposite end disposed along a first longitudinal axis, the second member has a proximal end and a distal end disposed along a second longitudinal axis, the opposite end and the proximal end are pivotally attached such that the second member is pivotable between limit positions with respect to the threaded end, the hammer is configured for pivotable movement about a pivot axis and over an arc defining a first plane, and the threaded end of the first member is attached with respect to the base such that the second member is movable into one of said limit positions in which the second longitudinal axis lies within a second plane, the second plane being perpendicular with the first plane and being parallel with or including the pivot axis of the hammer.

4. The method of claim 3 wherein the hammer impacts the second member substantially perpendicularly to the second longitudinal axis.

5. The method of claim 3 wherein the first member of the tie rod end is attached with respect to the base of the pendulum-type impact testing machine by attaching the threaded end of the first member to a support apparatus, and attaching the support apparatus to the base.

6. The method of claim 5 wherein the support apparatus is attached to the base of the pendulum-type impact testing machine by fasteners.

7. The method of claim 5 wherein the attachment of the threaded end of the first member to the support apparatus comprises threading at least one bolt into the threaded end.

8. The method of claim 5 wherein the first longitudinal axis is inclined with respect to the base when the threaded end of the first member is attached to the support apparatus.

9. The method of claim 8 wherein the first longitudinal axis lies within or parallel with the first plane when the threaded end of the first member is attached to the support apparatus.

10. The method of claim 9 wherein the base is substantially planar with a third plane and the third plane is perpendicular to each of the first plane and the second plane.

11. The method of claim 1 further comprising attaching an impact tip to the hammer of the pendulum-type impact testing machine, wherein the impact tip is configured to selectively impact a predetermined area of the second member of the tie rod end.

12. A method for measuring impact toughness of a tie rod end, the method comprising:
   providing a pendulum-type impact testing machine having a base, a hammer, and a measurement apparatus, wherein the hammer is configured for pivotable movement with respect to the base, about a pivot axis, and over an arc defining a first plane, and the measurement apparatus is configured to measure force arising from impact of the hammer upon an object secured with respect to the base;
   providing a tie rod end having a first member and a second member, the first member comprising a threaded end and at least a portion of a pivot ball joint opposite the threaded end, a proximal end of the second member interfacing said pivot ball joint such that a distal end of the second member is pivotable between limit positions with respect to the threaded end of the first member;
   attaching a support apparatus to the base of the pendulum-type impact testing machine;
   attaching the threaded end of the tie rod end to the support apparatus such that the distal end reaches one of the limit positions in which a longitudinal axis of the second member lies within a second plane perpendicular with the first plane and parallel with or including the pivot axis of the hammer;
   operating the pendulum-type impact testing machine such that the hammer impacts the second member substantially perpendicularly to the longitudinal axis of the second member; and
   measuring force arising from the impact through use of the measurement apparatus.

13. The method of claim 12 wherein the support apparatus is attached to the base of the pendulum-type impact testing machine by fasteners.

14. The method of claim 12 wherein the threaded end of the tie rod end is attached to the support apparatus by threading at least one bolt into the threaded end.

15. The method of claim 12 further comprising adjusting the temperature of the tie rod end to a predetermined temperature prior to operating the pendulum-type impact testing machine.

16. The method of claim 12 wherein the longitudinal axis of the first member is both inclined with respect to the base and lies within or parallel with the first plane when the threaded end of the first member is attached to the support apparatus, and wherein the base is substantially planar with a third plane and the third plane is perpendicular to each of the first plane and the second plane.

17. The method of claim 12 further comprising attaching an impact tip to the hammer of the pendulum-type impact testing machine, wherein the impact tip is configured to selectively impact a predetermined area of the second member of the tie rod end.

18. A support apparatus configured for supporting a tie rod end in a position to receive contact from a hammer of a pendulum-type impact testing machine, the support apparatus comprising:
   a mounting structure having a bottom surface and at least one mounting provision, the mounting provision configured to facilitate securement of the mounting structure such that the bottom surface contacts a base of a pendulum-type impact testing machine, wherein the bottom surface lies substantially within a first plane; and
   a support structure attached to the mounting structure and being inclined with respect to the first plane, wherein the support structure is configured to receive attachment of a first member of a tie rod end such that a second member of the tie rod end is movable into a limit position in which a longitudinal axis of the second member is perpendicular with the first plane.

19. The support apparatus of claim 18 being configured to rigidly and immovably support the first member of the tie rod end with respect to the base of the pendulum-type impact testing machine.

20. The support apparatus of claim 19 wherein the support structure is provided with an aperture configured to receive a threaded end of the first member of the tie rod end.

21. The support apparatus of claim 19 further comprising a cylindrical sleeve having a centrally and longitudinally extending bore configured to interface the first member of the tie rod end.

22. The support apparatus of claim 19 wherein the support structure is configured to support the first member of the tie rod end such that the hammer of the pendulum-type impact testing machine impacts the second member of the tie rod end substantially perpendicularly to the longitudinal axis of the second member of the tie rod end.

23. A pendulum-type impact testing machine comprising the support structure of claim 18.

* * * * *